United States Patent [19]

Nagano et al.

[11] Patent Number: 5,499,257
[45] Date of Patent: Mar. 12, 1996

[54] OUTPUT CONTROL APPARATUS FOR LASER OSCILLATOR

[75] Inventors: Osamu Nagano; Tsukasa Fukushima, both of Aichi, Japan

[73] Assignee: Mitsubishi Denki Kabushiki Kaisha, Tokyo, Japan

[21] Appl. No.: 178,002

[22] Filed: Jan. 6, 1994

[30] Foreign Application Priority Data

Jan. 7, 1993 [JP] Japan ................................. 5-001185

[51] Int. Cl.⁶ ..................................................... H01S 3/13
[52] U.S. Cl. .............................................. 372/31; 372/38
[58] Field of Search ........................................ 372/31, 38

[56] References Cited

U.S. PATENT DOCUMENTS

| 4,745,614 | 5/1988 | Egawa et al. ............................. 372/31 |
| 5,134,623 | 7/1992 | Egawa et al. ............................. 372/31 |
| 5,272,716 | 12/1993 | Soltz et al. ................................. 372/38 |
| 5,303,249 | 4/1994 | Weimel ...................................... 372/31 |
| 5,317,578 | 5/1994 | Ogou ......................................... 372/31 |
| 5,383,208 | 1/1995 | Queniat et al. ............................ 372/38 |

FOREIGN PATENT DOCUMENTS

| 0429652 | 6/1991 | European Pat. Off. . |
| 1161883 | 6/1989 | Japan . |
| 2143479 | 6/1990 | Japan . |
| 330452 | 3/1991 | Japan . |
| 4123483 | 4/1992 | Japan . |

OTHER PUBLICATIONS

Hostache, G. et al: Couples Thermoelectriques a definition spatiotemporelle fine. In French Journal: Revue General de Thermique, No. 299, Nov. 1986, pp. 539–543.

*Primary Examiner*—Rodney B. Bovernick
*Assistant Examiner*—Robert E. Wise
*Attorney, Agent, or Firm*—Sughrue, Mion, Zinn, Macpeak & Seas; Richard C. Turner

[57] ABSTRACT

A laser oscillator is connected to a power supply device for supplying excitation power to the laser oscillator and a detector is connected to detect the intensity of a laser beam output by the laser oscillator. An apparatus is provided for measuring the resistance value of the detector. A control circuit is operative to provide constant laser power control in response to the detector output under normal conditions but when the output signal of the measuring apparatus indicates a failure, the constant laser output control is changed to the constant power control. The apparatus prevents a constant laser output control from being disabled and workpieces from being defective if the output detector property of a laser changes abruptly.

8 Claims, 7 Drawing Sheets

OUTPUT CONTROL APPARATUS FOR LASER OSCILLATOR

BACKGROUND OF THE INVENTION

1. Field of the Invention

The present invention relates to an output control apparatus for a $CO_2$ gas laser oscillator employed in laser machining, such as cutting, etc.

2. Description of the Background Art

FIG. 7 is a block diagram illustrating the arrangement of an output control apparatus for a laser oscillator known in the art. In FIG. 7, part of a laser output 3 provided by an output mirror 2a in a laser oscillator 1 is extracted from a rear mirror 2b in the laser oscillator 1 and is input to a power sensor 4 constituted by a thermocouple in order to determine the intensity of the laser output 3. A control circuit 5 compares and amplifies an error signal between the value of a desired intensity of the laser output, as given by a laser output command 6, and the value of the output signal (proportional to the intensity of the laser output 3) of the power sensor 4 and provides the result to a power supply device 8 as a power command 7. Under the power command 7, the power supply device 8 supplies the laser oscillator 1 with excitation power, whereby laser oscillation is performed. Namely, constant laser output control is carried out by increasing or decreasing the input power (excitation power) of the laser oscillator so that the laser output 3 detected and fed back is equal to the laser output command 6.

It is generally known in the output control apparatus for the $CO_2$ gas laser oscillator that the power sensor for detecting the laser output is often constituted by a thermocouple, and its physical property value changes with time. In addition, it is known from experience that the change of the value with time is not linear and the property changes abruptly when it exceeds a given value.

However, the conventional output control apparatus for the laser oscillator is not equipped with a means of measuring the values or the relevant physical properties of the power sensor. Therefore, if an important property of the power sensor changes suddenly, and in an extreme case, its detection output value is zeroed during, for example, the cutting of a workpiece by the laser oscillator, the constant laser output control is disabled, causing all subsequent workpieces to be defective. Such a fault occurring during the long-time unmanned operation that often occurs at night presents a serious problem to the user of the laser oscillator.

It is an object of the present invention to overcome such disadvantages.

An object of the invention is to prevent workpieces from being defective if the property of the power sensor makes a sudden change and its detection output value changes abruptly.

An object of the invention is to output an alarm signal when the property of the power sensor has changed suddenly, thereby specifying the changing time of the power sensor.

SUMMARY OF THE INVENTION

In the output control apparatus for the laser oscillator concerned with the invention, when the resistance value of the laser output detector has exceeded a given value, the control circuit operates to automatically switch from constant laser output control to constant power control.

In the output control apparatus for the laser oscillator concerned with the invention, when the resistance value of the laser output detector has exceeded a given value, the control circuit operates to automatically switch constant laser output control mode to constant power control mode and output an alarm signal to the NC control apparatus.

In an output control apparatus for a laser oscillator concerned with the invention, there are connected together a laser oscillator, a power supply device for supplying excitation power to a laser oscillator, a detector for detecting the intensity of a laser beam output by the laser oscillator, measuring means connected with the detecting means for measuring the resistance value thereof, and a control circuit for receiving the output signal of the measuring means output in response to the output signal of the detecting means and an external laser output command giving the intensity of a laser output to give a power command to the power supply device. A memory storage is connected with the control circuit and stored with the input/output characteristic of the laser oscillator. The control circuit has a section which generally exercises constant laser output control in response to the laser output command and the detector output signal and a section which exercises control by automatically switching the constant laser output control mode to constant power control mode on the basis of the input/output characteristic of the laser oscillator stored in the memory storage when the resistance value of the detector measured by the measuring means has exceeded a given value.

An output control apparatus for a laser oscillator concerned with the present invention is the output control apparatus for the laser oscillator wherein a laser output command section giving the intensity of the laser output is disposed in an NC control apparatus which controls a whole laser cutting system, and a display section for displaying a detector changing time in response to the input of a signal given by the control circuit when the resistance value of the detector measured by a measuring means has exceeded a given value is provided in said NC control apparatus.

DESCRIPTION OF THE PREFERRED EMBODIMENTS

Figure 1:
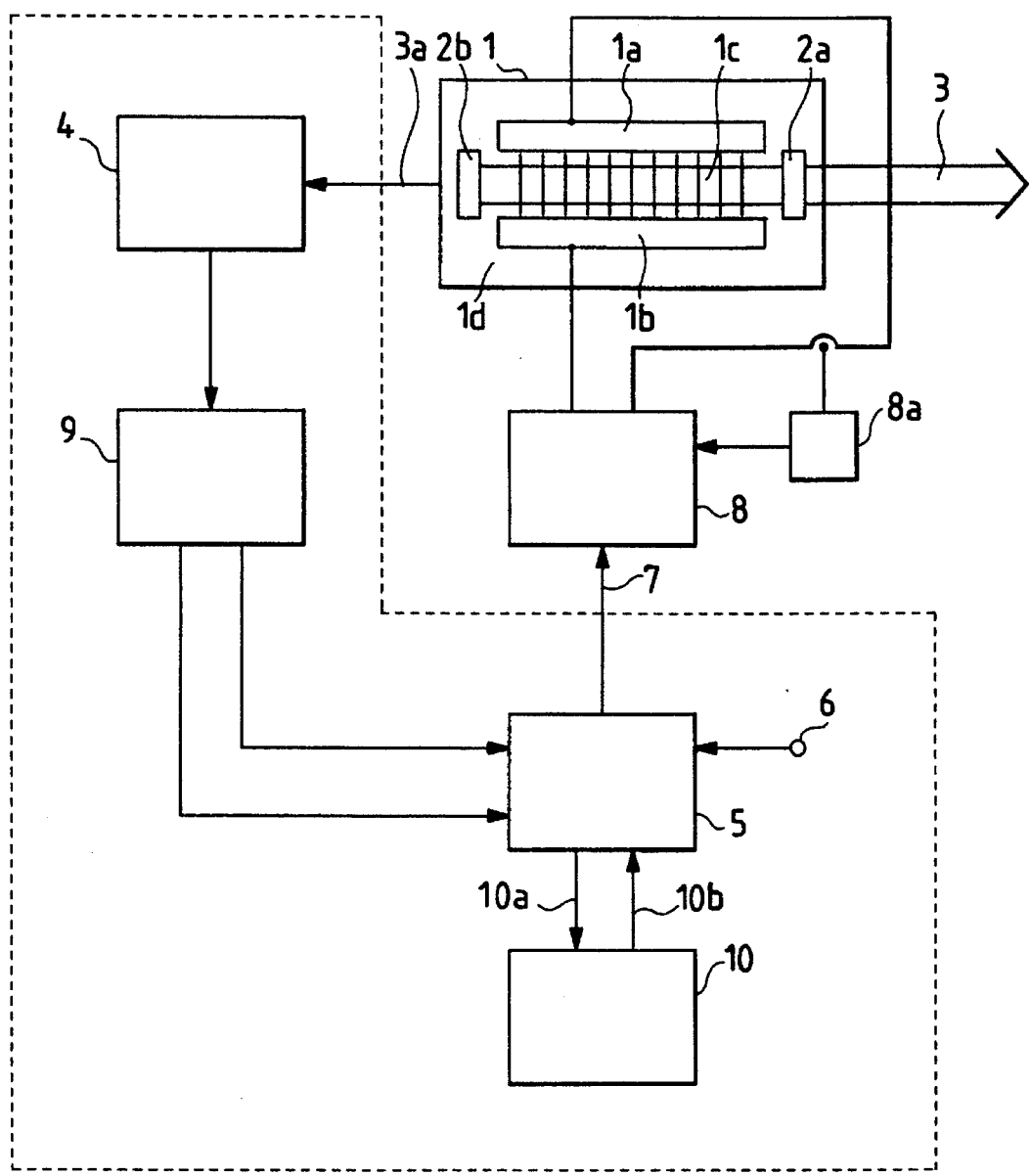
FIG. 1 is a block diagram illustrating the arrangement of an output control apparatus for a laser oscillator according to a preferred embodiment of the invention.

An embodiment of the invention will now be described with reference to the appended drawings. Referring to Fig.

1, in a laser oscillator 1, power supplied by a power supply device 8 causes a discharge 1c to occur between a pair of electrodes 1a and 1b, exciting a laser medium gas 1d which fills the laser oscillator 1. With this excited laser medium gas 1d in between, an output mirror 2a is disposed on one side and a rear mirror 2b is provided on the opposite side to constitute an optical resonator, whereby laser oscillation is generated.

A laser output 3 is provided from the output mirror 2a to the outside of the laser oscillator 1. A monitoring output 3a, which is part of the laser output 3, is extracted from the rear mirror 2b in the laser oscillator 1 and is input to a power sensor 4 constituted by a thermocouple, whereby the intensity of the laser output 3 is detected. A control circuit 5 receives the value of a laser output command 6 for giving the desired intensity of the laser output and the value of the output signal of the power sensor 4, compares and amplifies an error signal between the two values, and gives the result to a power supply device 8 as a power command 7.

Here, a conventional technique for excitation by high frequency silent discharge is used to excite the laser medium gas 1d. Also, by properly selecting the discharge gap distance, medium gas pressure and component ratio of the medium gas, the discharge voltage is kept approximately constant.

A well-known mathematical expression for the discharge power is:

(discharge power=discharge voltage×discharge current).

Accordingly, the value of discharge power is proportional to the discharge current value for the discharge 1c. Therefore, a current detector 8a is provided on a power line connecting the power supply device 8 and the electrodes 1a, 1b to detect the discharge current value of the discharge 1c and feed it back. In this manner, a power level proportional to the value of the power command 7 can be supplied to the laser oscillator 1. Namely, the apparatus in the first embodiment exercises constant laser output control by detecting and feeding back the laser output 3 and by supplying the power to the laser oscillator so that the laser output value detected and fed back is equal to the laser output command 6. In other words, constant laser output control is carried out by increasing or decreasing the power command value 7.

In FIG. 1, a measuring device 9 is connected to the power sensor 4 in order to measure the resistance value of the power sensor 4. This measuring device 9 is also connected to the control circuit 5 and outputs a voltage signal proportional to the measured resistance value of the power sensor 4 to the control circuit 5.

A memory storage device 10 is connected to the control circuit 5, and its input line and output line are connected with the control circuit 5. The storage device 10 stores the input/output characteristics (relationship between the discharge current Id and the laser output Wr) of the laser oscillator 1 and operates to output an output signal 10b to the control circuit 5 that is a power command value. That value corresponds to the input signal 10a, which is a desired laser output value from the control circuit 5.

Figure 2:
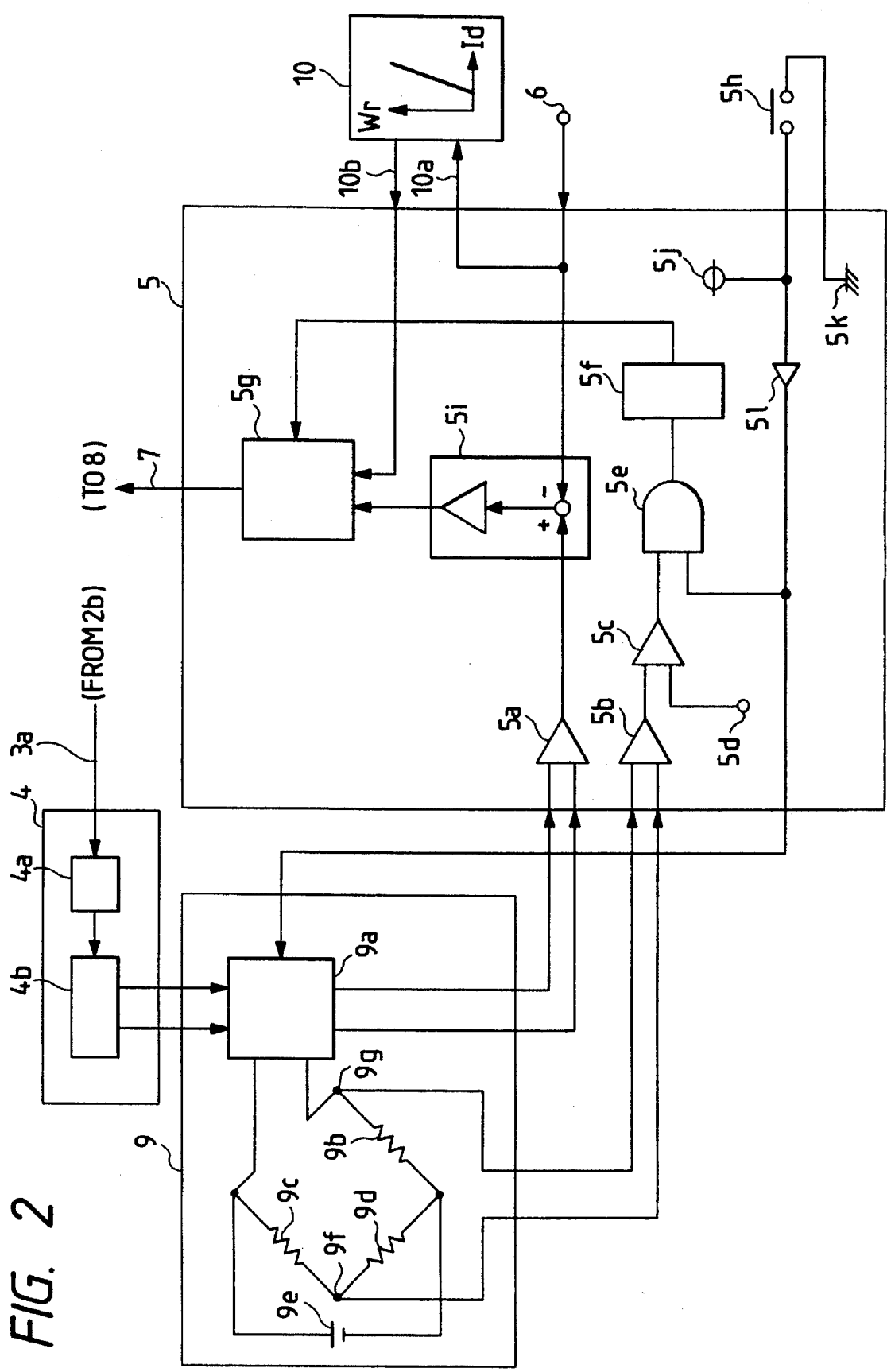
FIG. 2 is a block diagram illustrating the details of a part enclosed by a broken line in FIG. 1.

FIG. 2 shows the details of a part enclosed by a broken line in FIG. 1. In FIG. 2, 4a denotes a damper for proportionally reducing the monitoring output 3a to a proper output level and 4b represents a power sensor which receives the output of the damper 4a and constituted by a thermocouple. A first signal selector 9a is connected to the output lines of the power sensor 4b and operates to selectively connect the output lines of the power sensor 4b to either a first amplifier 5a described later or a bridge circuit described later under the control of the output signal of a buffer 5l described later. That is, when the output signal of the buffer 5l is "1", the output lines of the power sensor 4b are connected to the bridge circuit described later. Alternatively, when the output signal of the buffer 5l is "0", the output lines of the power sensor 4b are connected to the first amplifier 5a described later. The bridge circuit is constituted by resistors 9b, 9c, 9d, and a direct-current voltage source 9e, which applies a voltage to the bridge circuit. When the output lines of the power sensor 4b are connected to the bridge circuit by the operation of the first signal selector 9a as described above, the resistance value r of the power sensor 4b is given by the following expression:

$$r=R(E-2E0)/(E+2E0)(\Omega) \tag{1}$$

(where E>2E0, r<R)

r: resistance value of power sensor 4b ($\Omega$)

R: resistance value of resistors 9b, 9c, 9d ($\Omega$)

E: voltage value of direct-current voltage source 9e (V)

E0: voltage value generated between 9f and 9g of bridge circuit (V)

Accordingly, when the values of R and E are known and the value of E0 can be calculated, an operation performed according to Expression (1) provides the resistance value r of the power sensor 4b.

The inside of the control circuit 5 will now be described. In FIG. 2, when the output lines of the power sensor 4b have been connected to the first amplifier 5a by the operation of the first signal selector 9a as described above, the first amplifier 5a amplifies a very small output voltage generated at the thermocouple constituting the power sensor 4b. This very small output voltage is proportional to the output intensity of the laser output 3. 5b is an operator which receives a voltage developed between two points 9f and 9g in the bridge circuit and performs an operation according to the above Expression (1) to find the resistance value r of the power sensor 4b. 5c designates a comparator which receives the output signal of the operator 5b and a reference voltage signal 5d. When the output signal value of the operator 5b is larger than or equal to the reference voltage signal value 5d, the comparator 5c outputs a signal "1". Conversely, when the output signal value of the operator 5b is smaller than the reference voltage signal value 5d, the comparator 5c outputs a signal "0". 5e indicates a known AND circuit. 5f denotes a latch circuit which receives the output of the AND circuit 5e. The output cf the latch circuit 5f is "0" in the initial state, but once the input has become "1", the latch circuit it 5f operates to keep the output "1" until it is reset. 5g designates a second signal selector connected to the output line of the latch circuit 5f and designed to selectively connect as the power command 7 either the output of an error amplifier 5i described later or the output of the storage device 10 to the power supply device 8 under the control of the output signal of the latch circuit 5f. Namely, when the output signal of the latch circuit 5f is "1", the output line 10b of the storage device 10 is connected to the power supply device 8 as the power command 7. Alternatively, when the output signal of the latch circuit 5f is "0", the output line of the error amplifier 5i is connected to the power supply device 8 as the power command 7. 5i indicates the error amplifier which outputs to the second signal selector 5g an amplified signal resulting from comparison between the value of the laser output command 6 and the value of the output signal of the first amplifier 5a. 5h represents a switch which was not shown in FIG. 1 and is designed to select between "ON/OFF" of the laser output 3 of the laser oscillator 1. When the switch 5h is "closed", power not less than the "threshold value" of laser oscillation is supplied from the power supply device 8 to the laser oscillator 1 to provide the laser output 3. This state is hereinafter referred to as "beam ON". Reversely, when the switch 5h is "open", power less than the "threshold value" of laser oscillation is supplied from the power supply device 8 to the laser oscillator 1 and therefore laser oscillation does not take place and the laser output 3 is not provided. This state is hereinafter referred to as "beam OFF". 5j denotes a control power supply of the control circuit 5 and 5k designates a ground of the control power supply 5j. 5l indicates the known buffer circuit whose input is connected to the switch 5h and whose output is "0" in the "beam ON" state and is "1" in the "beam OFF" state.

Figure 4:
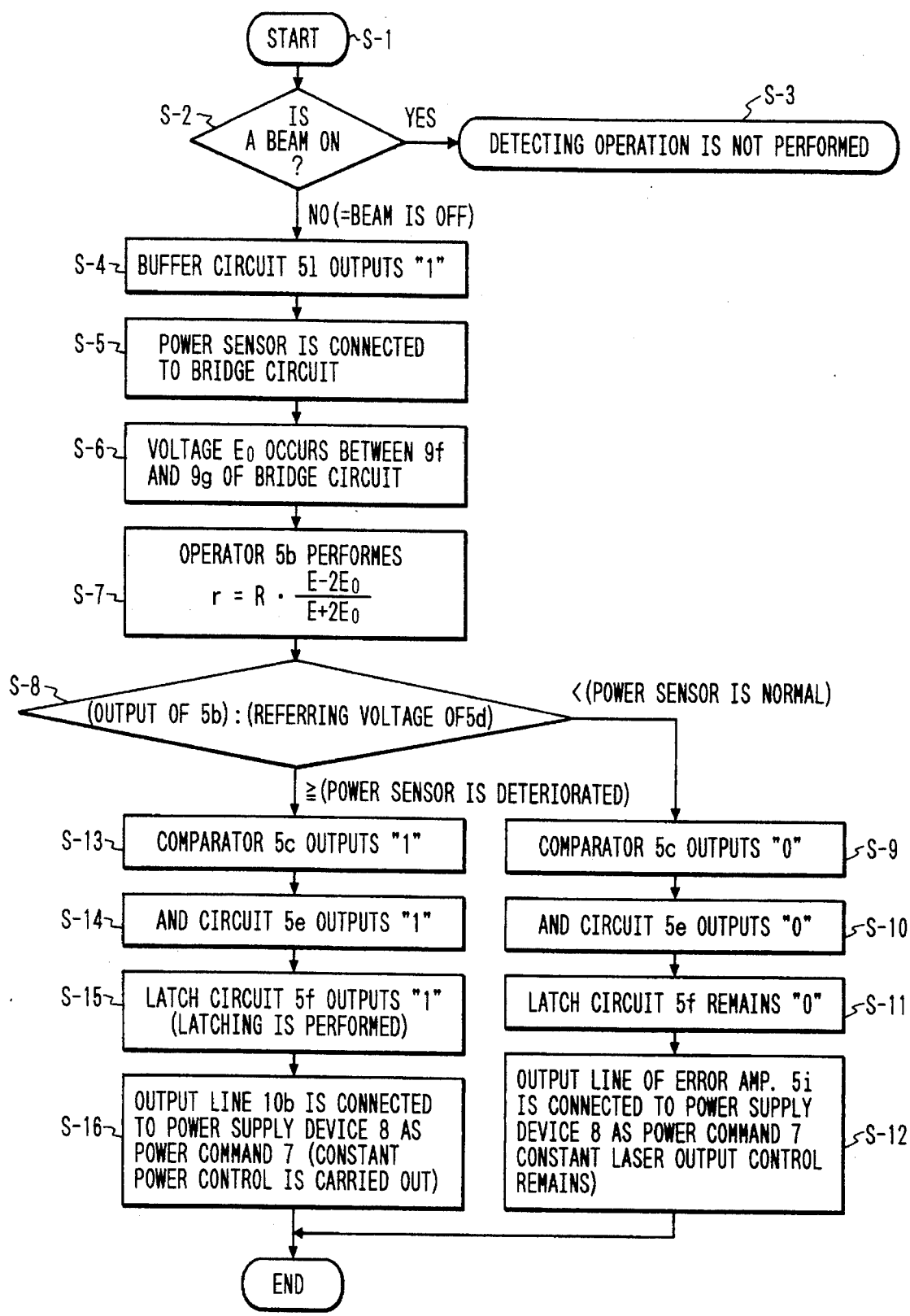
FIG. 4 is a flowchart to show the steps to detect power sensor deterioration for a laser oscillator according to the invention.

The operation of the invention will now be described in accordance with the arrangement of FIGS. 1 and 2, as well as the flow chart of FIG. 4. Initially, at the start (Step S-1), a determination is made as to whether the beam is On or OFF (Step S-2). When in the ON position, the detecting operation is not performed (Step S-3). When the beam is OFF, the detecting operation is performed.

When the switch 5h is "closed" or in the "beam ON" state, the power not less than the "threshold value" of the laser oscillation is supplied from the power supply device 8 to the laser oscillator 1 as described above, thereby causing the laser oscillation and providing the laser output 3. At this time, since the output lines of the power sensor 4b are connected to the first amplifier 5a by the operation of the first signal selector 9a, the control circuit 5 outputs to the second signal selector 5g the signal amplified by the error amplifier 5i after a comparison between the value of the laser output command 6 equivalent to the desired laser output and the value of the output signal of the first amplifier 5a equivalent to the intensity of the laser output 3. At this time, because the output signal of the latch circuit 5f is "0", the second signal selector 5g has operated to connect the output line of the error amplifier 5i to the power supply device 8 as the power command (i.e., the discharge current command) 7. That is, in the "beam ON" state, constant laser output control is exercised by increasing or decreasing the input power (in other words, the discharge current) of the laser oscillator so that the laser output 3 detected and fed back is equal to the laser output command 6.

The operation in the "beam OFF" state following Step S-2 will now be described. In the "beam OFF" state, the power less than the "threshold value" of laser oscillation is supplied from the power supply device 8 to the laser oscillator 1 as described above, whereby the laser oscillation does not occur and the laser output 3 is not provided. At this time, the output lines of the power sensor 4b are connected to the bridge circuit by the operation of the first signal selector 9a (Step S-5). There is a voltage generated between 9f and 9g of the bridge circuit (Step S-6). The voltage is operated on by the operator 5b to find the resistance value r of the power sensor 4b (Step S-7). The comparator 5c compares the output signal of the operator 5b, i.e., the voltage value equivalent to the resistance value of the power sensor 4b, with the value of the reference voltage signal 5d acting as a reference for determining the deterioration of the power sensor 4b (Step S-8). When the output signal value of the operator 5b is larger than or equal to the 5d reference voltage signal value 5d, the comparator 5c outputs a signal "1".

By contrast, when the output signal value of the operator 5b is smaller than the reference voltage signal value 5d, the comparator 5c outputs a signal "0" (Step S-9). As a result, the AND circuit 5e outputs a "0" (Step S-10) and the output of the latch circuit 5f remains "0" (Step S-11). Then, the output line of the error amplifier 5i is connected to the power supply device 8 as power command 7 (Step S-12). Hence, when the "beam ON" state occurs subsequently, operation is performed to exercise constant laser output control as described above.

In contrast, when in Step S-8 it is determined that the (output signal value of the operator 5b) is larger than or equal to the (reference voltage signal value 5d), the output of the comparator 5c is "1" (Step S-13), and in the "beam OFF" state, the output of the buffer circuit 5l is also "1". Hence, the output of the AND circuit 5e is "1" (Step S-14) and the output of the latch circuit 5f changes to "1" and is latched (Step S-15).

Accordingly, when the "beam ON" state takes place subsequently, the second signal selector 5g operates to connect the output line 10b of the storage device 10 to the power supply device 8 as the power command (i.e., the discharge current command) 7 as described above. Namely, in the "beam ON" state, the power command (discharge current command) 7 equivalent to the desired laser output command 6 is output on the basis of the input/output characteristic (which represents the relationship between the laser output Wr and the discharge current Id) of the laser oscillator 1 stored in the storage device 10 beforehand, whereby constant power control is carried out. Here, once changed to "1", the output of the latch circuit 5f remains "1" until it is reset (Step S-15), and therefore, the constant power control is kept exercised also in the subsequent "beam ON" state (Step S-16).

Figure 3A:
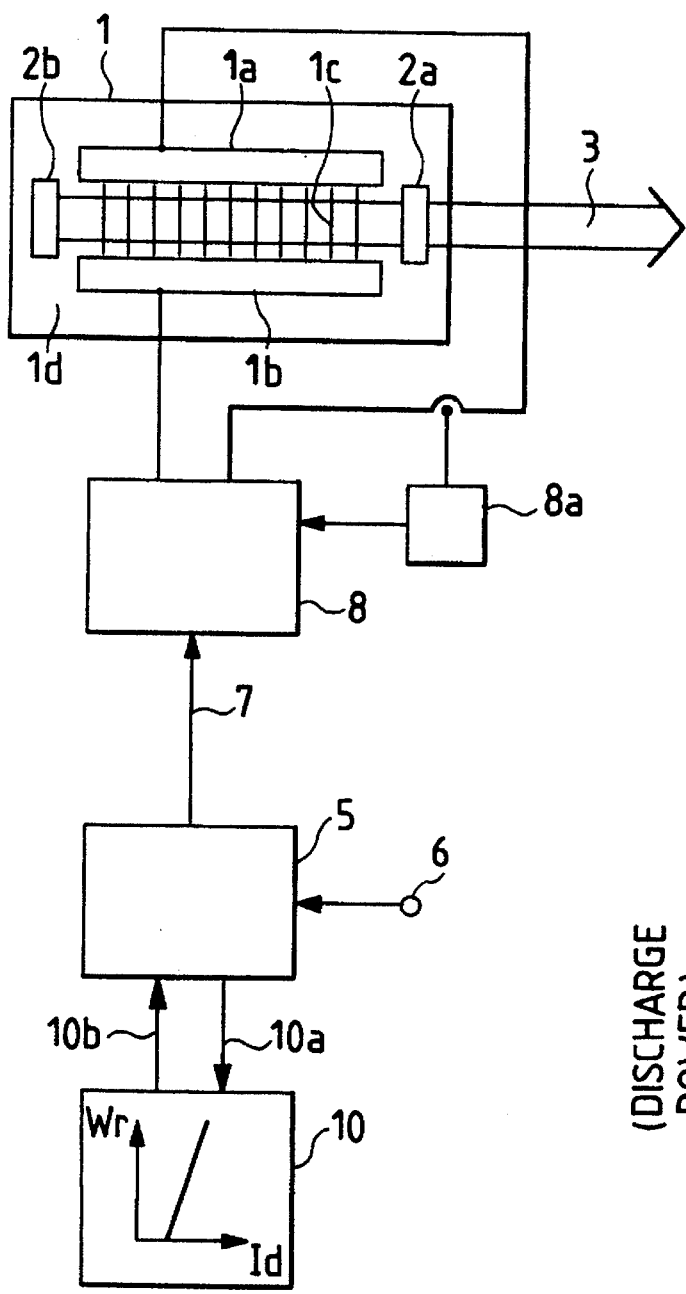
FIG. 3a is a block diagram illustrating a constant power control of a laser oscillator according to the invention and FIG. 3b is an illustration of a stored input/output characteristic.
Figure 3B:
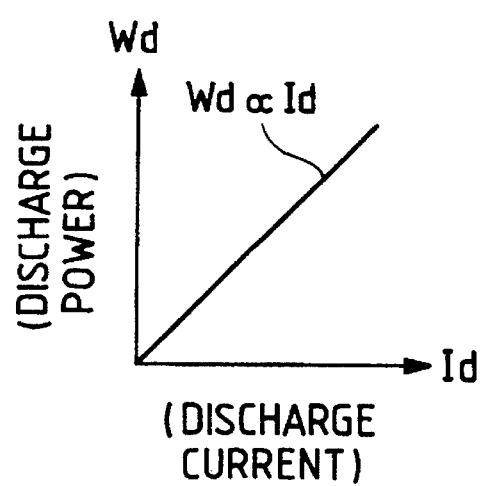

FIG. 3a is a block diagram to illustrate the case in which constant power control is exercised as explained above in this embodiment. The operation is now described. Control circuit 5 receives the value of a laser output command 6 (i.e., a desired laser output value) and outputs it to storage device 10 as input signal 10a. On the other hand, the storage device 10 outputs to control circuit 5 an output signal 10b corresponding to the input signal 10a by basing it on a previously stored input/output characteristic of the laser oscillator. The stored input/output characteristic is illustrated in FIG. 3b and may be based either on relationship between the laser output Wr and the discharge current Id or on relationship between Wr and the discharge power Wd. In response to the signal 10b, the control circuit 5 provides an output to the power supply device 8 as a current command (or a power command) 7. The power supply device 8 supplies power to electrodes 1a and 1b and at the same time, it feeds back the discharge current Id by the current detector 8a and exercises control so that the discharge current Id (or the discharge power Wd) is equal to the current command (or power command) 7.

A further embodiment of the invention will now be described with reference to FIG. 5, wherein 11 indicates an NC control apparatus for controlling the whole laser cutting system (oscillator, cooler, drive table, cutting head, etc.).

Figure 5:
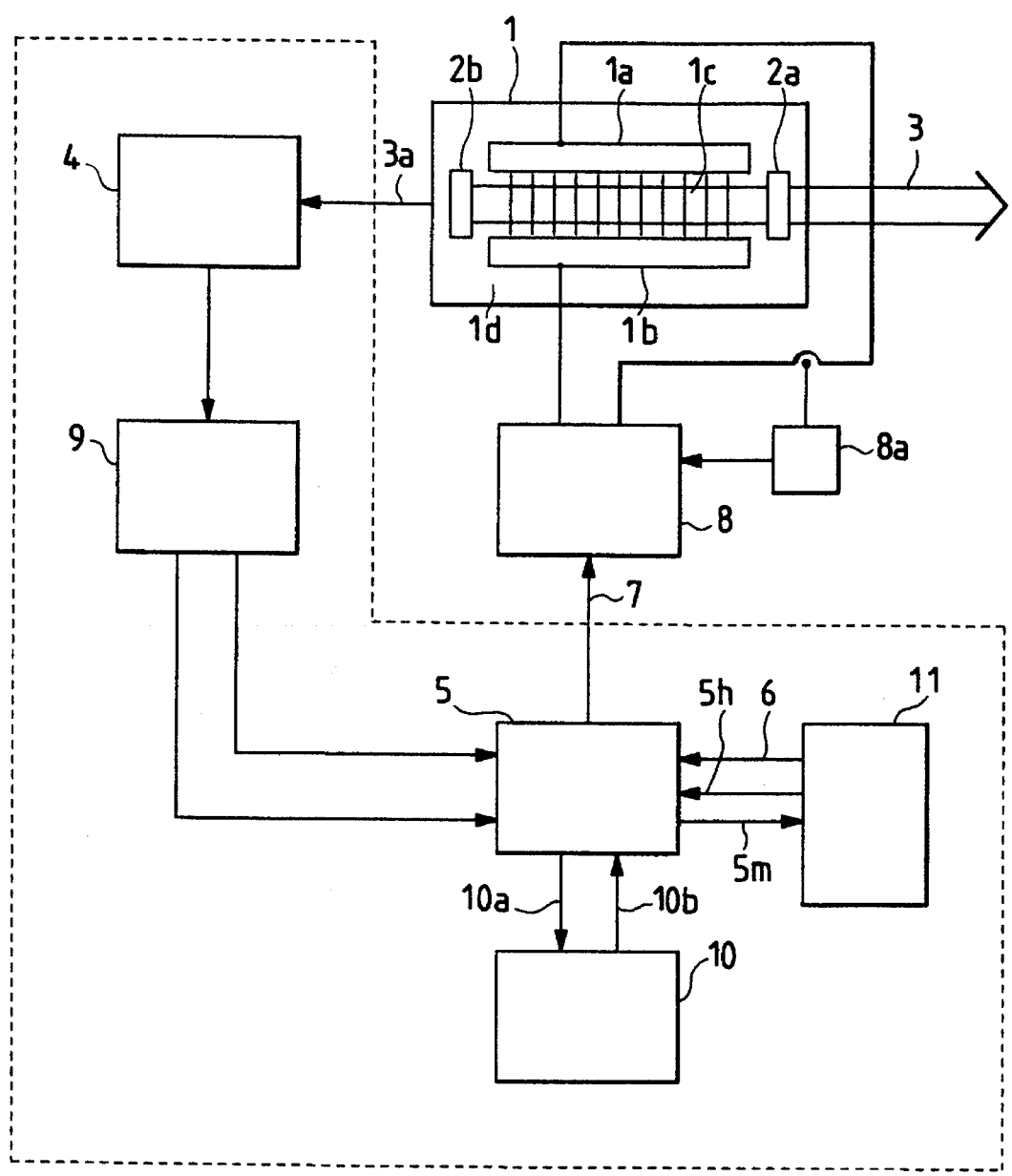
FIG. 5 is a block diagram illustrating the arrangement of an output control apparatus for a laser oscillator according to a second embodiment of the invention.
Figure 6:
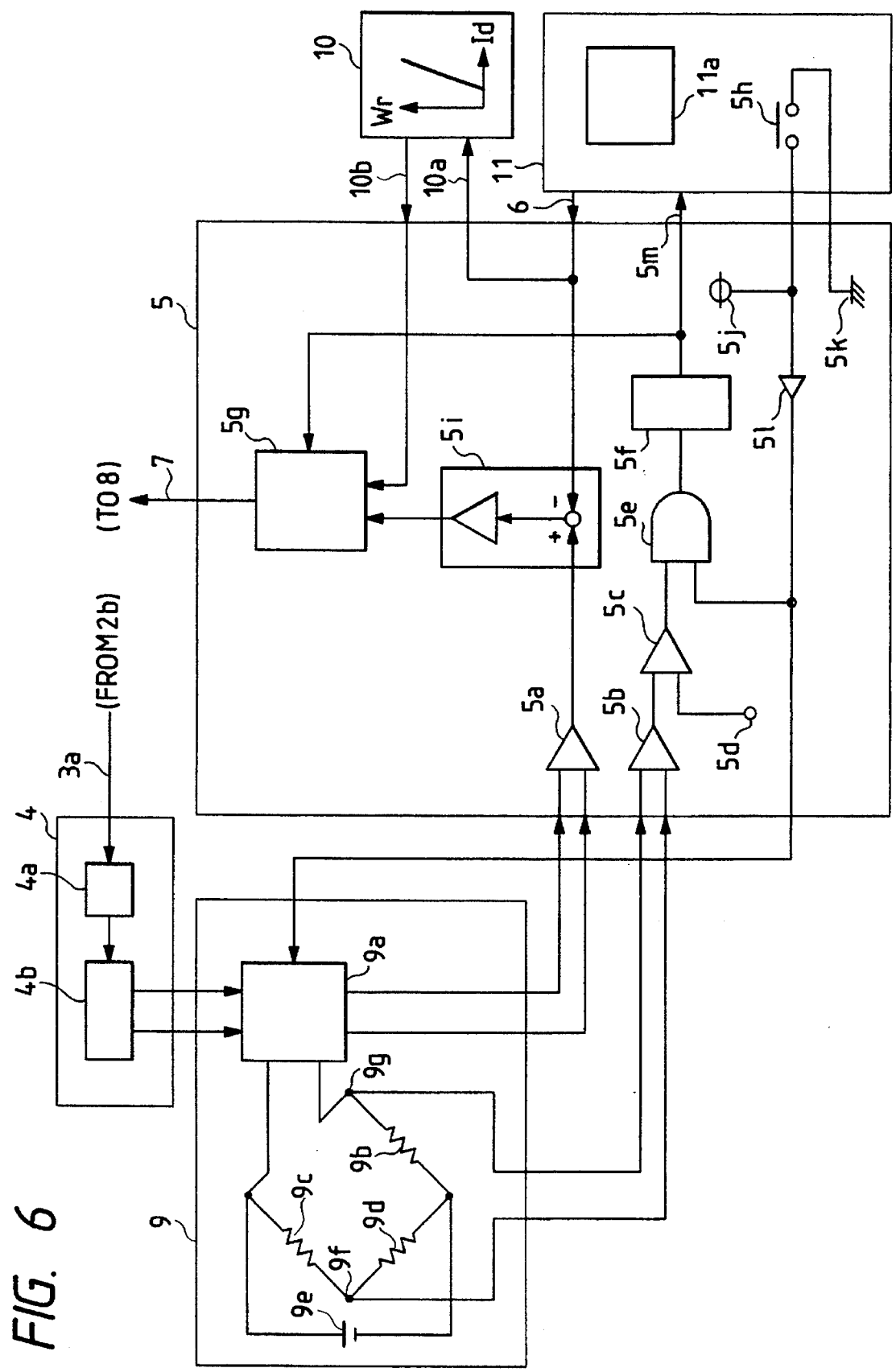
FIG. 6 is a block diagram illustrating the details of a part enclosed by a broken line in FIG. 5.
Figure 7:
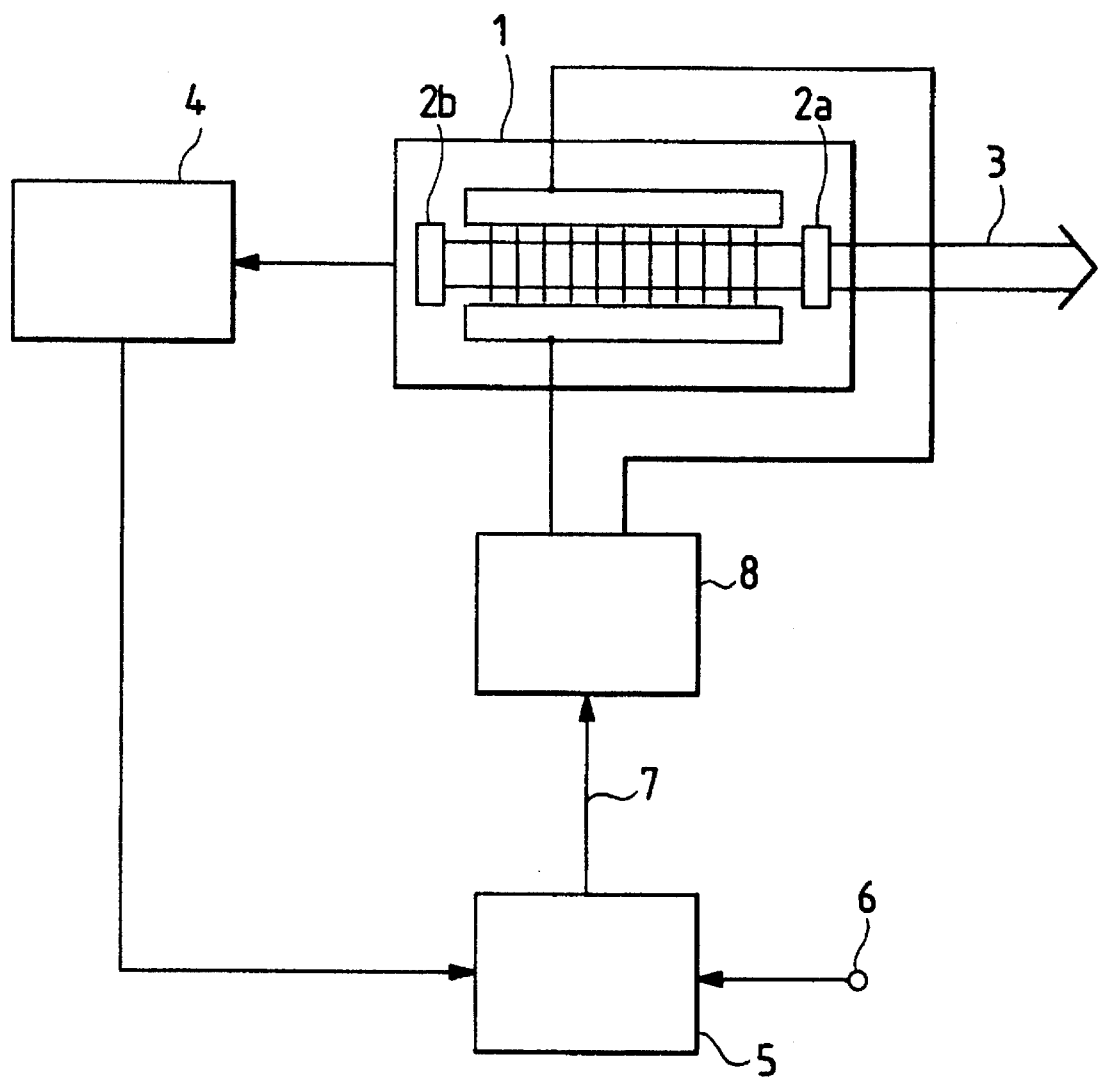
FIG. 7 is a block diagram illustrating the arrangement of an output control apparatus for a laser oscillator known in the art.

FIG. 6 shows the details of a part enclosed by a broken line in FIG. 5. In FIG. 5, 5f denotes a latch circuit which receives the output of the AND circuit 5e and 5m represents an output signal of the latch circuit 5f and is connected to the NC control apparatus 11. 6 designates a laser output command output from the NC control apparatus 11 to the control circuit 5 and 5h indicates a beam ON/OFF switch output from the NC control apparatus 11 to the control circuit 5. 11a denotes a display device (such as a CRT) installed on the NC control apparatus 11.

The operation of the invention will now be described in accordance with FIGS. 5 and 6. As in the operation of the first embodiment, when the switch 5h is "closed", i.e., in the "beam ON" state, the power not less than the "threshold value" of the laser oscillation is supplied from the power supply device 8 to the laser oscillator 1 as described above, thereby generating the laser oscillation and providing the laser output 3. At this time, the output lines of the power sensor 4b are connected to the first amplifier 5a by the operation of the first signal selector 9a, whereby the control circuit 5 outputs to the second signal selector 5g the signal amplified by the error amplifier 5i after comparison between the value of the laser output command 6 equivalent to the desired laser output and the value of the output signal of the first amplifier 5a equivalent to the intensity of the laser output 3 provided. At this time, as the output signal of the latch circuit 5f is "0", the second signal selector 5g has operated to connect the output line of the error amplifier 5i to the power supply device 8 as the power command (discharge current command) 7. Namely, in the "beam ON" state, constant laser output control is exercised by increasing/decreasing the input power (discharge current) of the laser oscillator so that the laser output 3 detected and fed back is equal to the laser output command 6. Also, at this time, since the output signal 5m of the latch circuit 5f is "0", i.e., the "power sensor is normal", the display device installed on the NC control apparatus 11 provides no display concerning the power sensor.

The operation in the "beam OFF" state will now be described. In the "beam OFF" state, the power less than the "threshold value" of laser oscillation is supplied from the power supply device 8 to the laser oscillator 1 as described above, whereby the laser oscillation does not occur and the laser output 3 is not provided. At this time, the output lines of the power sensor 4b are connected to the bridge circuit by the operation of the first signal selector 9a and the voltage generated between 9f and 9g of the bridge circuit is operated on by the operator 5b to find the resistance value of the power sensor 4b. The comparator 5c compares the output signal of the operator 5b, i.e., the voltage value equivalent to the resistance value of the power sensor 4b, with the value of the reference voltage signal 5d acting as the guideline of the deterioration of the power sensor 4b. When the output signal value of the operator 5b is larger than or equal to the reference voltage signal value 5d, the comparator 5c outputs a signal "1". By contrast, when the output signal value of the operator 5b is smaller than the reference voltage signal value 5d, the comparator 5c outputs a signal "0".

Now, when the output signal value of the operator 5b is smaller than the reference voltage signal value 5d, the output of the latch circuit 5f remains "0". Hence, when the "beam ON" state occurs subsequently, operation is performed to exercise constant laser output control as described above.

Conversely, when the output signal value of the operator 5b is larger than or equal to the reference voltage signal value 5d, the output of the comparator 5c is "1" and the output of the buffer circuit 5l is also Hence, the output of the AND circuit 5e is "1" and the output of the latch circuit 4f changes to "1" and is latched. At this time because the output signal 5m of the latch circuit 5f is "1", i.e., the "power sensor is faulty", the display device installed on the NC control apparatus 11 displays the "power sensor changing time". Therefore, after the "beam ON" state takes place subsequently, the second signal selector 5g operates to connect the output line 10b of the storing means 10 to the power supply device 8 as the power command (discharge current command) 7. That is, in the "beam ON" state, the power command (current command) 7 equivalent to the desired laser output command 6 is output on the basis of the input/output characteristic (which represents the relationship between the laser output Wr and the discharge current Id) of the laser oscillator 1 stored in the storing means 10 beforehand, thereby carrying out constant power control. Here, once changed to "1", the output of the latch circuit 5f remains "1" until it is reset, whereby the constant power control is kept exercised also in the subsequent "beam ON" state. Similarly, the display device installed on the NC control apparatus 11 keeps displaying the "power sensor changing time."

In the output control apparatus for the laser oscillator concerned with the invention, when the resistance value of the power sensor measured by the measuring means has exceeded a given value, the control circuit automatically switches from a constant laser output control mode to a constant power control mode. Therefore, if the property of the power sensor changes suddenly, its detection output value is zeroed, and the constant laser output control mode is disabled during the cutting of a workpiece by the laser oscillator, the invention prevents all workpieces from being defective.

In the output control apparatus for the laser oscillator concerned with the second embodiment, the control circuit is connected to the NC control apparatus for controlling the whole laser cutting system, and when the resistance value of the power sensor measured by said measuring means has exceeded a given value, said control circuit automatically switches the constant laser output control mode to the constant power control mode on the basis of the input/output characteristic of the laser oscillator stored in said storing means and also outputs an alarm signal to said NC control apparatus, thereby providing a display on the display device on the NC control apparatus. As in the first embodiment, therefore, the second embodiment prevents all workpieces from being defective and also makes the power sensor changing time clear, affording convenience to laser cutting workers in maintenance.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention.

What is claimed is:

1. An output control apparatus for a laser oscillator, comprising:

a laser oscillator;

a power supply device for supplying excitation power to said laser oscillator;

a detector for detecting the intensity of a laser beam output by said laser oscillator and outputting a signal indicative of said intensity;

a measuring means connected to said detector for measuring the output value of said detector and outputting a measurement signal; and a control circuit for providing a power command to said power supply device based on said measurement signals and a desired laser output command indicative of a desired intensity of the laser beam output;

wherein said power command output by said control circuit indicates operation of the laser oscillator according to a constant power control mode when the measured output value of said detector exceeds a reference value, and otherwise indicates operation of the laser oscillator according to a constant laser output control mode; and wherein said power supply device supplies excitation power to maintain the laser output to be equivalent to the desired laser output command when said power command indicates constant laser output control, and to provide the applied power based on a predetermined value when said power command indicates constant power control.

2. The output control apparatus for the laser oscillator as defined in claim 1, further comprising storing means connected with said control circuit for storing an input/output characteristic of said laser oscillator.

3. The output control apparatus for the laser oscillator as defined in claim 2, wherein said predetermined value is based on the input/output characteristic of said laser oscillator stored in said storing means.

4. The output control apparatus for the laser oscillator as defined in claim 3, wherein said input/output characteristic is based on a relationship between the laser output and a discharge current.

5. The output control apparatus for the laser oscillator as defined in claim 3, wherein said input/output characteristic is based on a relationship between the laser output and a discharge power.

6. The output control apparatus for the laser oscillator as defined in claim 1, further comprising:

a laser output command means for inputting the desired laser output command, said laser output command means being disposed in an NC control apparatus which controls a laser cutting system; and a display means for displaying information regarding changes in said detector measured by said measuring means.

7. The output control apparatus for the laser oscillator as defined in claim 6, wherein said information regarding changes in said detector includes a time when a measured resistance value of said detector exceeds the reference value.

8. The output control apparatus for the laser oscillator as defined in claim 6, wherein said information regarding changes in said detector include a time when said detector changes are measured by said measuring means.

* * * * *